United States Patent
Soejima

(10) Patent No.: US 10,171,294 B2
(45) Date of Patent: Jan. 1, 2019

(54) INFORMATION PROCESSING DEVICE AND SYSTEM DESIGN SUPPORT METHOD

(71) Applicant: NEC Corporation, Minato-ku, Tokyo (JP)

(72) Inventor: Kenji Soejima, Tokyo (JP)

(73) Assignee: NEC CORPORATION, Tokyo (JP)

(*) Notice: Subject to any disclaimer, the term of this patent is extended or adjusted under 35 U.S.C. 154(b) by 311 days.

(21) Appl. No.: 14/915,685

(22) PCT Filed: Aug. 21, 2014

(86) PCT No.: PCT/JP2014/004274
§ 371 (c)(1),
(2) Date: Mar. 1, 2016

(87) PCT Pub. No.: WO2015/040788
PCT Pub. Date: Mar. 26, 2015

(65) Prior Publication Data
US 2016/0197779 A1    Jul. 7, 2016

(30) Foreign Application Priority Data
Sep. 17, 2013  (JP) .................... 2013-191725

(51) Int. Cl.
*H04L 12/24* (2006.01)
*G06F 8/20* (2018.01)

(52) U.S. Cl.
CPC ............ *H04L 41/0806* (2013.01); *G06F 8/20* (2013.01)

(58) Field of Classification Search
CPC ............................... H04L 41/0806; G06F 8/20
(Continued)

(56) References Cited

U.S. PATENT DOCUMENTS 7,441,021 B1 * 10/2008 Perry .................. H04L 41/0806
345/33
2010/0293252 A1 * 11/2010 Soejima .................. H04L 67/02
709/219
(Continued)

FOREIGN PATENT DOCUMENTS

JP    H10-301901 A    11/1998
JP    H10301901    *    11/1998
(Continued)

OTHER PUBLICATIONS

"OpenStack Open Source Cloud Computing Software", OpenStack project, [online], [retrieved on Sep. 2, 2013], Internet <URL: http://www.openstack.org/>.
(Continued)

*Primary Examiner* — Krisna Lim

(57) ABSTRACT

Consistency between a requirement for communication with respect to software in a system and a requirement for a network is maintained, without re-designing a network by the user. A requirement conversion unit (110) of a system design support device (100) generates a requirement for communication between computers based on a requirement for communication between software components included in a system, and based on identifiers of the computers in which the software components are deployed. The requirement conversion unit (110) generates a requirement for a network for connecting between the computers based on the requirement for communication between the computers. The setting generation unit (120) generates a setting relating to a network, a setting relating to communication between computers, and a setting relating to communication between software components based on the requirement for the network, the requirement for communication between the
(Continued)

computers, and the requirement for communication between the software components.

10 Claims, 21 Drawing Sheets

(58) Field of Classification Search
USPC .......................................................... 709/222
See application file for complete search history.

(56) References Cited

U.S. PATENT DOCUMENTS

| | | | | |
|---|---|---|---|---|
| 2011/0093570 A1* | 4/2011 | Mackin | .................... | G06F 8/00 709/220 |
| 2013/0246679 A1* | 9/2013 | Miyoshi | .................. | G06F 13/40 710/300 |
| 2014/0149783 A1* | 5/2014 | Georgiev | ............ | G06F 11/0793 714/4.2 |

FOREIGN PATENT DOCUMENTS

| | | | |
|---|---|---|---|
| JP | 2004-040433 | A | 2/2004 |
| JP | 2004040433 | * | 2/2004 |
| JP | 2013-097394 | A | 5/2013 |
| JP | 2013097394 | * | 5/2013 |
| JP | 2013-183203 | A | 9/2013 |
| JP | 2013183203 | * | 9/2013 |
| WO | 2012/035861 | A1 | 3/2012 |

OTHER PUBLICATIONS

Ryo Nakamura, "An implementation of cloud service network using SDN", Sep. 6, 2013, IEICE Technical Report, vol. 113/No. 200.
International Search Report for PCT Application No. PCT/JP2014/004274, dated Nov. 25, 2014.
English translation of Written opinion for PCT Application No. PCT/JP2014/004274.

* cited by examiner

Fig. 8

SW COMMUNICATION REQUIREMENT INFORMATION

| SW COMMUNICATION REQUIREMENT ID | CONNECTION SOURCE/ CONNECTION DESTINATION | CHARACTERISTICS CONDITION |
|---|---|---|
| RSWab | SWa/SWb | PROTOCOL:TCP/IP, PORT NUMBER:8080 |
| RSWac | SWa/SWc | PROTOCOL:TCP/IP, PORT NUMBER:5678 |

Fig. 9

SW DEPLOYMENT INFORMATION

| COMPONENT ID | DEPLOYMENT DESTINATION VIRTUAL MACHINE ID |
|---|---|
| SWa | VMm |
| SWb | VMn |
| SWc | VMn |

Fig. 10

SW INFORMATION ~141

| COMPONENT ID | PROVIDING FUNCTION | SW REQUIREMENT/SETTING CONVERSION RULE |
|---|---|---|
| SWa | SETTING OF PROTOCOL AND PORT NUMBER | ... |
| SWb | SETTING OF PROTOCOL AND PORT NUMBER | ... |
| SWc | SETTING OF PROTOCOL AND PORT NUMBER | ... |

ADAPTABLE SW COMMUNICATION REQUIREMENT INFORMATION

| COMPONENT ID | ADAPTABLE SW COMMUNICATION REQUIREMENT ID |
|---|---|
| SWb | RSWab |
| SWc | RSWac |

Fig. 13

VM COMMUNICATION REQUIREMENT INFORMATION

| VM COMMUNICATION REQUIREMENT ID | CONNECTION SOURCE/ CONNECTION DESTINATION | CHARACTERISTICS CONDITION |
|---|---|---|
| RVMmn | VMm/VMn | PROTOCOL:TCP/IP, PORT NUMBER:8080<br>PROTOCOL:TCP/IP, PORT NUMBER:5678 |

ADAPTABLE VM COMMUNICATION REQUIREMENT INFORMATION

| IaaS | ADAPTABLE VM COMMUNICATION REQUIREMENT ID |
|---|---|
| OpenStack Nova | RVMmn |

Fig. 17

NW REQUIREMENT INFORMATION

| NW REQUIREMENT ID | CONNECTION SOURCE/ CONNECTION DESTINATION | CHARACTERISTICS CONDITION |
|---|---|---|
| RNWx | VMm/VMn | PROTOCOL:TCP/IP, PORT NUMBER:8080<br>PROTOCOL:TCP/IP, PORT NUMBER:5678 |

Fig. 19

ADAPTABLE NW REQUIREMENT INFORMATION

| NaaS | ADAPTABLE NW REQUIREMENT ID |
|---|---|
| OpenStack Neutron | RNWx |

Fig. 20

NW SETTING INFORMATION

| OBJECT | SETTING |
|---|---|
| NETWORK (Network1) | |
| NW PORT (Port1) | IP ADDRESS:192.168.0.1<br>NETWORK:Network1<br>SECURITY GROUP:Group1 |
| NW PORT (Port2) | IP ADDRESS:192.168.0.2<br>NETWORK:Network1<br>SECURITY GROUP:Group1 |
| SECURITY GROUP (Group1) | CONNECTION SOURCE/CONNECTION DESTINATION:Port1/Port2<br>PORT NUMBER:8080, 5678 |

Fig. 21

VM SETTING INFORMATION

| OBJECT | SETTING |
|---|---|
| VM INSTANCE (VMm) | INTERFACE : IF1 |
| INTERFACE (IF1) | NW PORT : Port1(192.168.0.1) |
| VM INSTANCE (VMn) | INTERFACE : IF2 |
| INTERFACE (IF2) | NW PORT : Port2(192.168.0.2) |

Fig. 22

SW SETTING INFORMATION

| OBJECT (COMPONENT) | SETTING |
|---|---|
| SWb | PORT NUMBER : 8080 |
| SWc | PORT NUMBER : 5678<br>TRANSMISSION SOURCE IP ADDRESS : 192.168.0.1 |

INFORMATION PROCESSING DEVICE AND SYSTEM DESIGN SUPPORT METHOD

This application is a National Stage Entry of PCT/JP2014/004274 filed on Aug. 21, 2014, which claims priority from Japanese Patent Application 2013-191725 filed on, Sep. 17, 2013, the contents of all of which are incorporated herein by reference, in their entirety.

TECHNICAL FIELD

The present invention relates to an information processing device and a system design support method.

BACKGROUND ART

In recent years, as an IT (Information Technology) system is complicated and large-scaled, it is possible to execute a large amount of transactions by a plurality of mutually communicable computers. In order to configure such a large-scale system, an extremely large amount of cost is required for preparing computers, wiring to configure a network, and the like.

In order to solve the aforementioned drawback, a system configuration method on the basis of a virtualization technology is proposed. For instance, NPL 1 proposes system configuration software (OpenStack (registered trademark)) capable of generating a large number of computers and networks by virtual computers and networks. In the system configuration software described in NPL 1, a system is configured by connecting virtual machines by virtual ports on a virtual network.

CITATION LIST

Non Patent Literature

[NPL 1] "OpenStack Open Source Cloud Computing Software", OpenStack project, [online], [retrieved on Sep. 2, 2013], Internet <URL: http://www.openstack.org/>

SUMMARY OF INVENTION

Technical Problem

In order to implement the aforementioned large-scale system, it is necessary to design a network for connecting between computers, and to maintain consistency between a requirement for the designed network, and a requirement for communication between software components using the network. However, designing a network and designing a software configuration are performed individually. Therefore, a user is required to re-design a network, every time a software configuration is changed.

For instance, it is assumed that the system configuration software disclosed in NPL 1 is used for configuring a system. In this case, a user is required to re-design a requirement for communication between virtual machines, a requirement for a virtual network, a setting relating to a virtual network, and the like, every time a software configuration such as a virtual machine in which a software component is deployed is changed.

An object of the present invention is to provide an information processing device and a system design support method that enable to solve the above problem and to maintain consistency between a requirement for communication with respect to software in a system and a requirement for a network, without re-designing a network by a user.

Solution to Problem

An information processing device according to an exemplary aspect of the invention includes: a requirement conversion means for generating a requirement for communication between computers, based on a requirement for communication between software components included in a system, and based on identifiers of the computers in which the software components are deployed, and generating a requirement for a network for connecting between the computers, based on the requirement for communication between the computers; and a setting generation means for generating a setting of the network, a setting relating to communication between the computers, and a setting relating to communication between the software components, based on the requirement for the network, the requirement for communication between the computers, and the requirement for communication between the software components.

A system design support method according to an exemplary aspect of the invention includes: generating a requirement for communication between computers, based on a requirement for communication between software components included in a system, and based on identifiers of the computers in which the software components are deployed, and generating a requirement for a network for connecting between the computers, based on the requirement for communication between the computers; and generating a setting of the network, a setting relating to communication between the computers, and a setting relating to communication between the software components, based on the requirement for the network, the requirement for communication between the computers, and the requirement for communication between the software components.

A computer readable storage medium recording thereon a program, causes a computer for a system design support device to perform a method including: generating a requirement for communication between computers, based on a requirement for communication between software components included in a system, and based on identifiers of the computers in which the software components are deployed, and generating a requirement for a network for connecting between the computers, based on the requirement for communication between the computers; and generating a setting of the network, a setting relating to communication between the computers, and a setting relating to communication between the software components, based on the requirement for the network, the requirement for communication between the computers, and the requirement for communication between the software components.

Advantageous Effects of Invention

An advantageous effect of the present invention is maintaining consistency between a requirement for communication with respect to software in a system and a requirement for a network, without re-designing a network by a user.

BRIEF DESCRIPTION OF DRAWINGS

FIG. 8 is a diagram illustrating an example of SW communication requirement information in the first exemplary embodiment of the present invention;

FIG. 9 is a diagram illustrating an example of SW deployment information in the first exemplary embodiment of the present invention;

FIG. 10 is a diagram illustrating an example of SW information 141 in the first exemplary embodiment of the present invention;

FIG. 13 is a diagram illustrating an example of VM communication requirement information in the first exemplary embodiment of the present invention;

FIG. 17 is a diagram illustrating an example of NW requirement information in the first exemplary embodiment of the present invention;

FIG. 19 is a diagram illustrating an example of adaptable NW requirement information in the first exemplary embodiment of the present invention;

FIG. 20 is a diagram illustrating an example of NW setting in the first exemplary embodiment of the present invention;

FIG. 21 is a diagram illustrating an example of VM setting information in the first exemplary embodiment of the present invention;

FIG. 22 is a diagram illustrating an example of SW setting information in the first exemplary embodiment of the present invention;

DESCRIPTION OF EMBODIMENTS

First Exemplary Embodiment

A first exemplary embodiment of the present invention is described.

First of all, a configuration of the first exemplary embodiment of the present invention is described.

Figure 2:
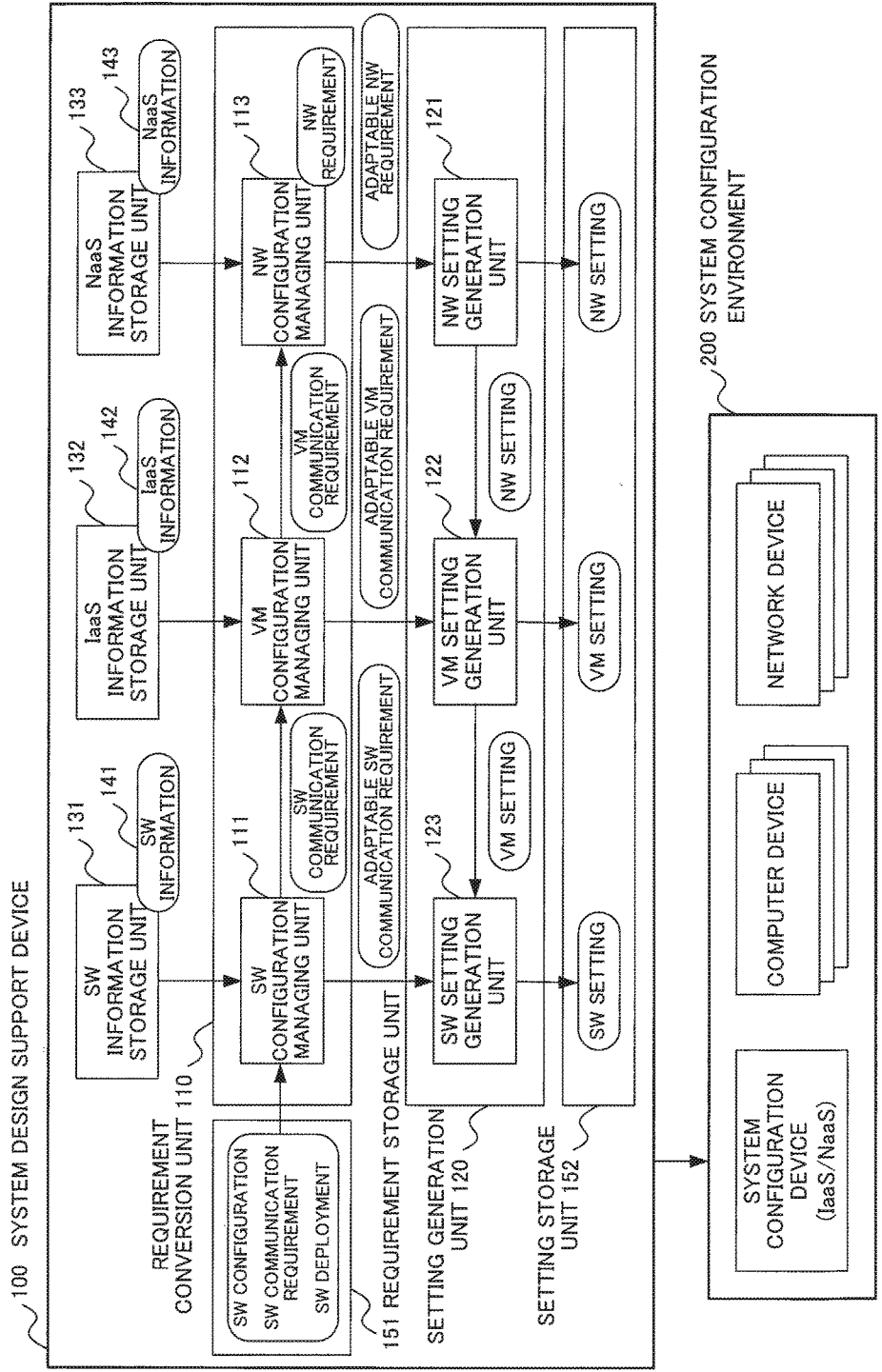
FIG. 2 is a block diagram illustrating a configuration of a system design support device 100 in the first exemplary embodiment of the present invention.

FIG. 2 is a block diagram illustrating a configuration of a system design support device 100 in the first exemplary embodiment of the present invention. The system design support device 100 is an exemplary embodiment of an information processing device of the present invention.

The system design support device 100 is communicatively connected to a system configuration environment 200.

The system configuration environment 200 includes a system configuration device, one or more computer devices, and one or more network devices such as a network switch and a router.

The system configuration device configures an IT system (hereinafter, simply called as a system) on a computer device and on a network device of the system configuration environment 200. The system configuration device configures a system using a setting relating to communication between components (an SW (Software) setting), a setting relating to communication between virtual machines (a VM (Virtual Machine) setting), and a setting relating to a network (an NW (Network) setting). The SW setting, the VM setting, and the NW setting are generated by the system design support device 100. The system configuration device includes the functions of an IaaS (Infrastructure as a Service) and a NaaS (Network as a Service).

The IaaS performs generation and setting of a virtual machine (VM) as a virtual computer on a computer device. Further, the NaaS performs generation and setting of a virtual network for connecting between virtual machines on a computer device and on a network device. The NaaS is normally provided with the IaaS. The system configuration device deploys software components such as an Operating System (OS), a Middleware (MW), and an Application (AP) configuring a system on a generated virtual machine. In the following, these software components are simply called as components or program modules.

The system design support device 100 includes a requirement conversion unit 110, a setting generation unit 120, an SW information storage unit 131, an IaaS information storage unit 132, a NaaS information storage unit 133, a requirement storage unit 151, and a setting storage unit 152.

The requirement storage unit 151 stores SW configuration information, SW communication requirement information, and SW deployment information. The SW configuration information indicates components configuring a system (SW configuration). The SW communication requirement information indicates requirements for communication between components (SW communication requirements). The SW deployment information indicates identifiers of virtual machines in which components are deployed (SW deployment). The SW configuration information, the SW communication requirement information, and the SW deployment information are input by a user or the like of the system design support device 100, and are stored in the requirement storage unit 151.

The SW information storage unit 131 stores SW information 141 indicating a providing function relating to the characteristics condition of communication, and an SW requirement/setting conversion rule of a component.

The IaaS information storage unit 132 stores IaaS information 142 indicating a providing function relating to the characteristics condition of communication, and a VM requirement/setting conversion rule of a virtual machine to be generated by the IaaS.

The NaaS information storage unit 133 stores NaaS information 143 indicating a providing function relating to the characteristics condition of communication, and an NW requirement/setting conversion rule of a virtual network to be generated by the NaaS.

The SW information 141, the IaaS information 142, and the NaaS information 143 are input in advance by the user, an administrator, or the like of the system design support device 100. The input SW information 141, IaaS information 142, and NaaS information 143 are respectively stored in the SW information storage unit 131, the IaaS information storage unit 132, and the NaaS information storage unit 133.

The requirement conversion unit 110 generates a requirement for communication between virtual machines (a VM communication requirement) on the basis of the SW communication requirement information and the SW deployment information. Further, the requirement conversion unit 110 generates a requirement for a network (an NW requirement) on the basis of the generated VM communication requirement.

The requirement conversion unit 110 includes an SW configuration managing unit 111, a VM configuration managing unit 112, and an NW configuration managing unit 113.

The SW configuration managing unit 111 extracts a requirement adaptable in each of the components (an adaptable SW communication requirement) from among the SW communication requirements on the basis of the SW information 141.

The VM configuration managing unit 112 converts an SW communication requirement into a VM communication requirement. Further, the VM configuration managing unit 112 extracts a requirement adaptable in the IaaS (an adaptable VM communication requirement) from among the VM communication requirements on the basis of the IaaS information 142.

The NW configuration managing unit 113 converts a VM communication requirement into an NW requirement. Further, the NW configuration managing unit 113 extracts a requirement adaptable in the NaaS (an adaptable NW requirement) from among the NW requirements on the basis of the NaaS information 143.

The setting generation unit 120 generates an NW setting, a VM setting, and an SW setting on the basis of the adaptable NW requirement, the adaptable VM communication requirement, and the adaptable SW communication requirement, respectively.

The setting generation unit 120 includes an NW setting generation unit 121, a VM setting generation unit 122, and an SW setting generation unit 123.

The NW setting generation unit 121 generates an NW setting on the basis of an adaptable NW requirement.

The VM setting generation unit 122 generates a VM setting on the basis of an adaptable VM communication requirement.

The SW setting generation unit 123 generates an SW setting on the basis of an adaptable SW communication requirement.

The setting storage unit 152 stores an NW setting, a VM setting, and an SW setting generated by the setting generation unit 120, as NW setting information, VM setting information, and SW setting information, respectively.

The system design support device 100 may be a computer including a CPU (Central Processing Unit) and a storage medium storing programs, and operated by the control based on the programs. Further, the SW information storage unit 131, the IaaS information storage unit 132, the NaaS information storage unit 133, the requirement storage unit 151, and the setting storage unit 152 may be respectively implemented in individual storage media, or may be implemented in one storage medium.

Figure 3:
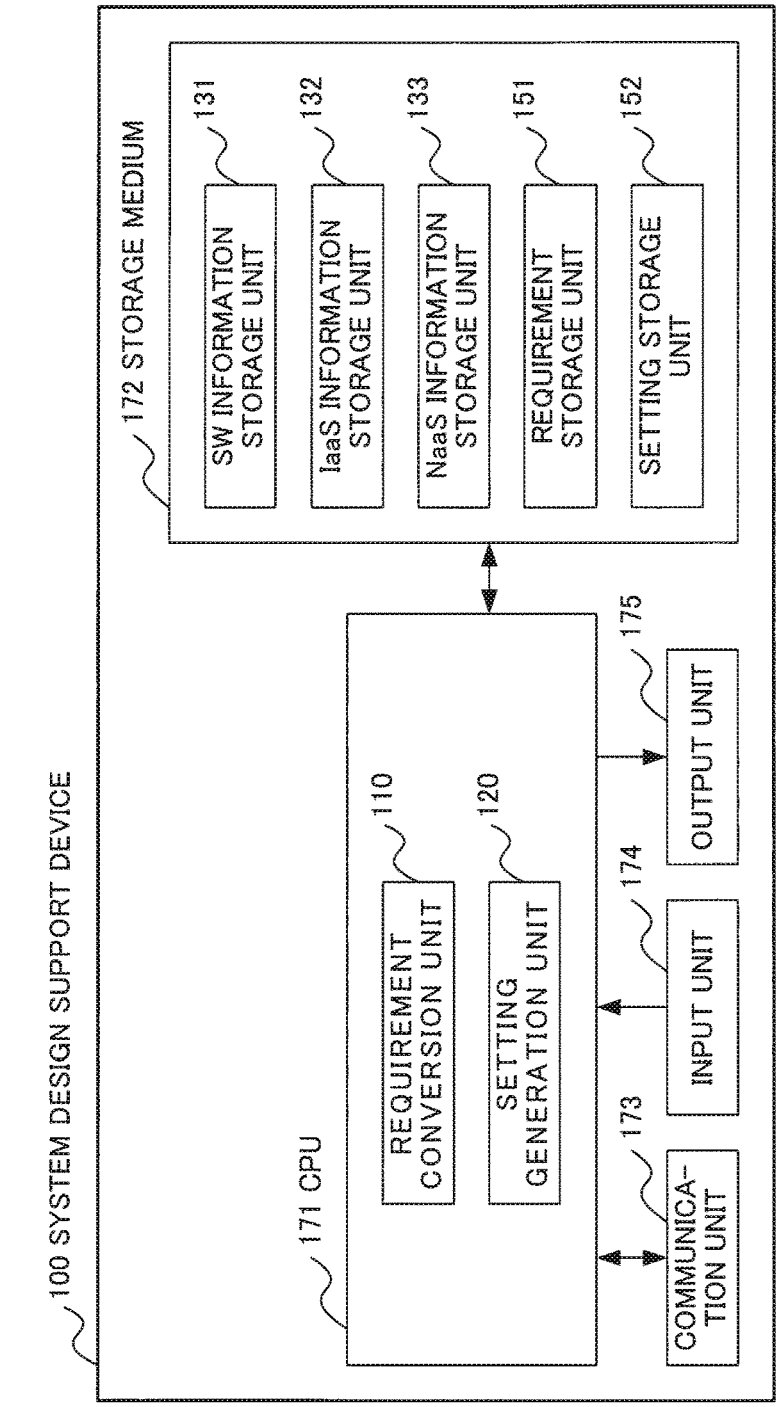
FIG. 3 is a block diagram illustrating a configuration of the system design support device 100 implemented in a computer in the first exemplary embodiment of the present invention.

FIG. 3 is a block diagram illustrating a configuration of the system design support device 100 implemented in a computer in the first exemplary embodiment of the present invention.

Referring to FIG. 3, the system design support device 100 includes a CPU 171, a storage medium 172, a communication unit 173, an input unit 174, and an output unit 175. The CPU 171 executes a computer program for implementing the functions of the requirement conversion unit 110 and the setting generation unit 120. The storage medium 172 stores data in the SW information storage unit 131, the IaaS information storage unit 132, the NaaS information storage unit 133, the requirement storage unit 151, and the setting storage unit 152. The communication unit 173 transmits, to the system configuration environment 200, NW setting information, VM setting information, and SW setting information. The input unit 174 is, for example, an input device such as a keyboard, and accepts input of SW configuration information, SW communication requirement information, and SW deployment information from the user or the like. The output unit 175 is, for example, a display device such as a display, and displays generated NW setting information, VM setting information, and SW setting information to the user or the like.

Next, an operation of the first exemplary embodiment of the present invention is described.

First of all, a requirement conversion process in the first exemplary embodiment of the present invention is described.

Figure 4:
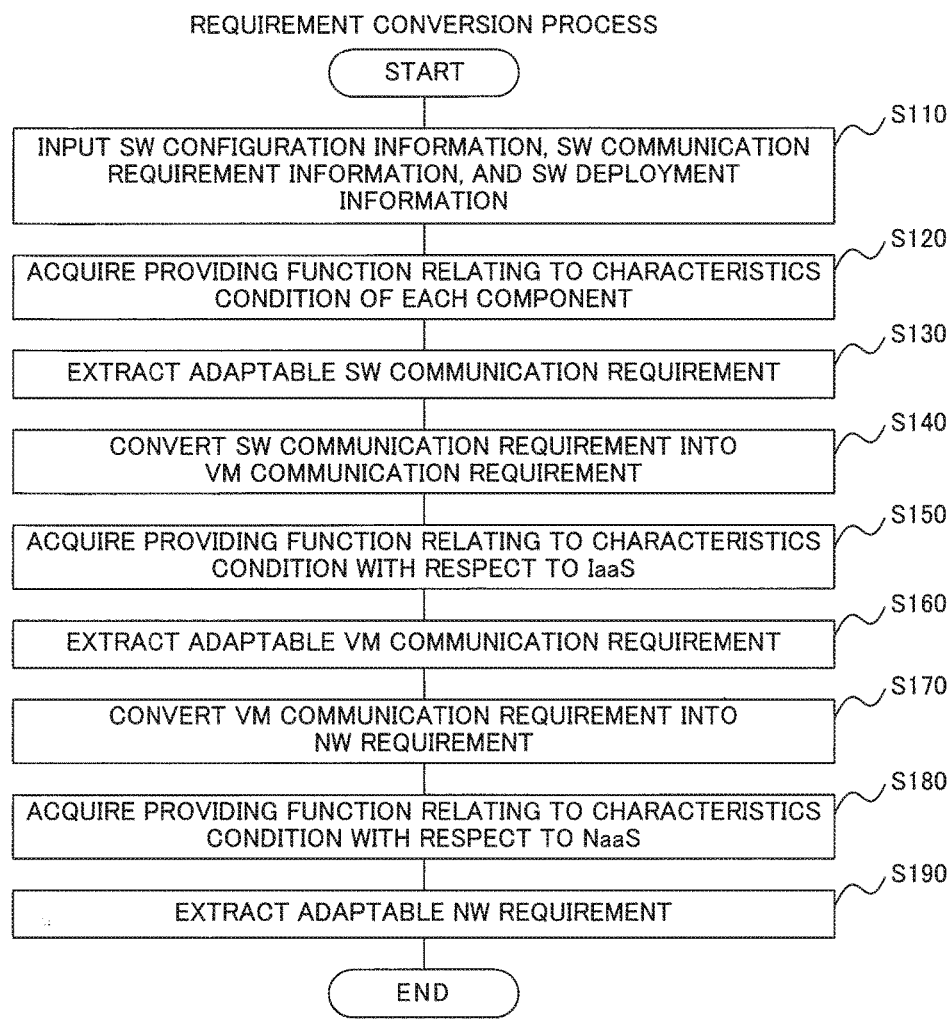
FIG. 4 is a flowchart illustrating a requirement conversion process in the first exemplary embodiment of the present invention.

FIG. 4 is a flowchart illustrating the requirement conversion process in the first exemplary embodiment of the present invention.

First of all, the system design support device 100 accepts user's input of SW configuration information, SW communication requirement information, and SW deployment information (Step S110). The input SW configuration information, SW communication requirement information, and SW deployment information are stored in the requirement storage unit 151.

Figure 6:
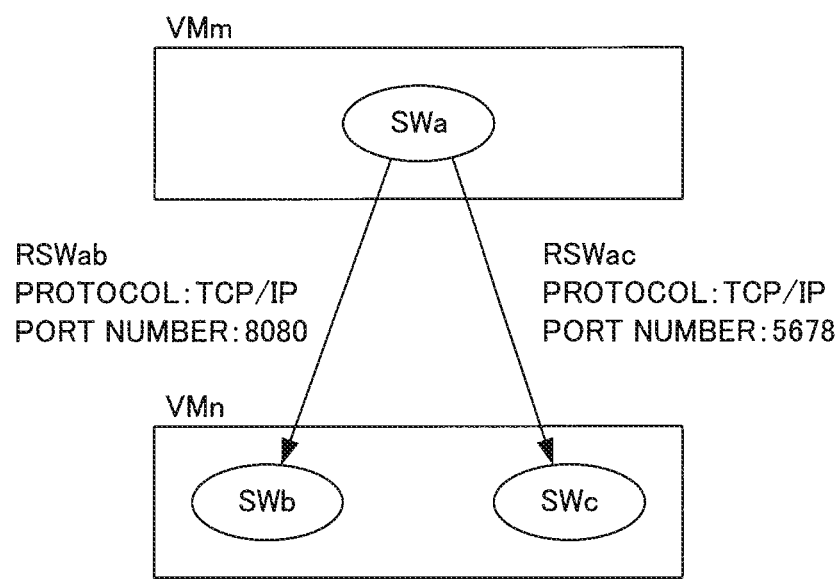
FIG. 6 is a block diagram illustrating an example of connection between components in the first exemplary embodiment of the present invention.

FIG. 6 is a block diagram illustrating an example of connection between components in the first exemplary embodiment of the present invention.

Figure 7:
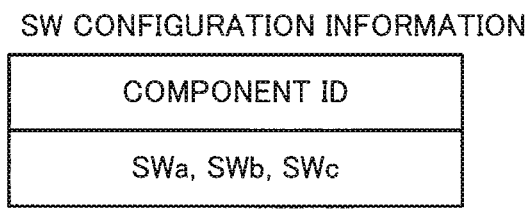
FIG. 7 is a diagram illustrating an example of SW configuration information in the first exemplary embodiment of the present invention.

FIG. 7, FIG. 8, and FIG. 9 are diagrams illustrating examples of SW configuration information, SW communication requirement information, and SW deployment information, respectively, in the first exemplary embodiment of the present invention. The SW configuration information in FIG. 7, the SW communication requirement information in FIG. 8, and the SW deployment information in FIG. 9 are associated with the connection in FIG. 6.

The SW configuration information indicates identifiers (component IDs (Identifiers)) of the components constituting a system, as illustrated in FIG. 7, the. The SW configuration information in FIG. 7 indicates that a system is constituted by three components "SWa", "SWb", and "SWc", as illustrated in FIG. 6. The text between the double quotation marks indicates the identifier (component ID) of each of the components. In the following, the same expression is used for identifiers of an SW communication requirement, a VM communication requirement, an NW requirement, and the like.

The SW communication requirement information indicates identifiers of components as a connection source/connection destination and the characteristics conditions relating to communication (connection) between components, as illustrated in FIG. 8. As the characteristics conditions, requirements other than requirements for the connection source/connection destination, such as a condition of a communication protocol, a connection destination port number (hereinafter, simply called as a port number), and a QoS (Quality of Service) are set. In the SW communication requirement information in FIG. 8, the connection from the component "SWa" to the component "SWb" as illustrated in FIG. 6 is set as the SW communication requirement "RSWab". As the characteristics condition of the SW communication requirement "RSWab", the protocol: TCP (Transmission Control Protocol)/IP (Internet Protocol) and the port number: 8080 are set. Further, as the SW communication requirement "RSWac", the connection from the component "SWa" to the component "SWc" by the protocol: TCP/IP and the port number: 5678 as illustrated in FIG. 6 is set.

The SW deployment information indicates identifiers of virtual machines as deployment destinations of the components, as illustrated in FIG. 9. The SW deployment information in FIG. 9 indicates that the component "SWa" is deployed in the virtual machine "VMm", and the components "SWb" and "SWc" are deployed in the virtual machine "VMn", as illustrated in FIG. 6.

The SW configuration managing unit 111 of the requirement conversion unit 110 acquires a providing function relating to the characteristics condition of each of the components from the SW information 141 (Step S120).

FIG. 10 is a diagram illustrating an example of the SW information 141 in the first exemplary embodiment of the present invention. The SW information 141 indicates a providing function and an SW requirement/setting conversion rule for each of the components, as illustrated in FIG. 10. The providing function indicates a function providable in a component concerning the characteristics condition of communication. The SW requirement/setting conversion rule indicates a conversion rule from an SW communication requirement to an SW setting to be described later.

The SW information 141 in FIG. 10 indicates such that it is possible, in each of the components, to set a protocol and a port number for connection to the other component. Specifically, the SW information 141 indicates such that it is possible, in each of the components, to establish connection in response to a connection request from the other component designating a specific protocol and a specific port number.

For example, the SW configuration managing unit 111 acquires providing functions of the components "SWa", "SWb", and "SWc" from the SW information 141 in FIG. 10.

The SW configuration managing unit 111 extracts a communication requirement (hereinafter, called as an adaptable SW communication requirement) which each of the components can satisfy from among the SW communication requirements included in the SW communication requirement information (Step S130). The SW configuration managing unit 111 extracts an SW communication requirement which each of the components can satisfy with use of the providing function acquired in Step S120, as an adaptable SW communication requirement. The SW configuration managing unit 111 outputs the extracted adaptable SW communication requirement to the SW setting generation unit 123, as adaptable SW communication requirement information.

Figures 11, 12:
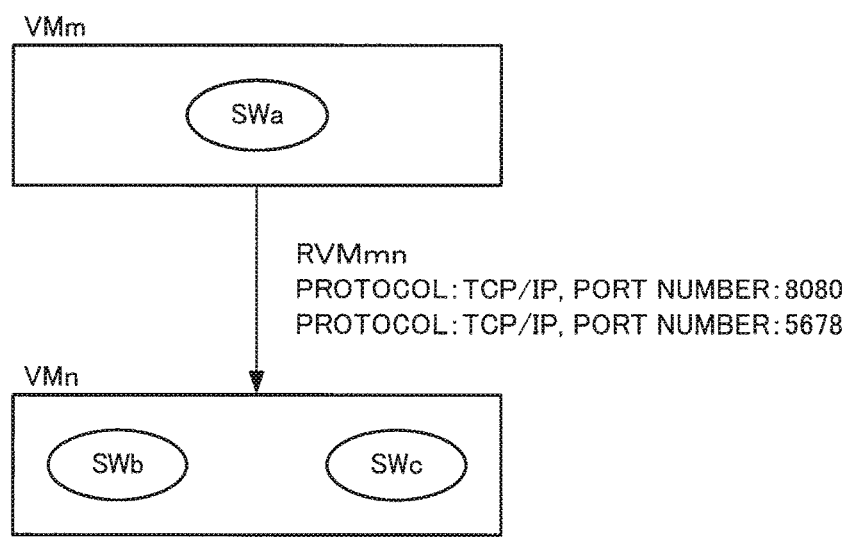
FIG. 11 is a diagram illustrating an example of adaptable SW communication requirement information in the first exemplary embodiment of the present invention.
FIG. 12 is a block diagram illustrating an example of connection between virtual machines in the first exemplary embodiment of the present invention.

FIG. 11 is a diagram illustrating an example of adaptable SW communication requirement information in the first exemplary embodiment of the present invention.

For example, the component "SWb" has a setting on a protocol and a port number as a providing function. In this case, the component "SWb" satisfies the characteristics condition with respect to the connection source/connection destination: "SWa"/"SWb", which are designated by the SW communication requirement "RSWab", namely, the protocol: TCP/IP and the port number: 8080. Likewise, the component "SWc" satisfies the characteristics condition with respect to the connection source/connection destination: "SWa"/"SWc", which are designated by the SW communication requirement "RSWac", namely, the protocol: TCP/IP and the port number: 5678. Therefore, the SW configuration managing unit 111 extracts an adaptable SW communication requirement, as illustrated in FIG. 11.

Subsequently, the VM configuration managing unit 112 converts an SW communication requirement included in the SW communication requirement information into a VM communication requirement, and generates VM communication requirement information (Step S140). For example, the VM configuration managing unit 112 generates a VM communication requirement by integrating SW communication requirements sharing the same virtual machines as the connection source/connection destination on the basis of the SW deployment information.

FIG. 12 is a block diagram illustrating an example of connection between virtual machines in the first exemplary embodiment of the present invention.

FIG. 13 is a diagram illustrating an example of the VM communication requirement information in the first exemplary embodiment of the present invention. The VM communication requirement information in FIG. 13 is associated with the connection in FIG. 12.

The VM communication requirement information indicates identifiers of virtual machines as a connection source/connection destination and the characteristics conditions relating to communication (connection) between virtual machines, as illustrated in FIG. 13.

For example, in the SW deployment information illustrated in FIG. 9, the component "SWa" is deployed in the virtual machine "VMm", and the components "SWb" and "SWc" are deployed in the virtual machine "VMn". Therefore, the SW communication requirement "RSWab" relating to connection from the component "SWa" to the component "SWb", and the SW communication requirement "RSWac" relating to connection from the component "SWa" to the component "SWc" in the SW communication requirement information in FIG. 8 are integrated, as illustrated in FIG. 12 and FIG. 13. Specifically, the SW communication requirement "RSWab" and the SW communication requirement "RSWac" are integrated into the VM communication requirement "RVMmn" relating to connection from the virtual machine "VMm" to the virtual machine "VMn". In this case, both of the characteristics conditions of the SW communication requirements "RSWab" and "RSWac" are set as the characteristics condition of the VM communication requirement "RVMmn".

The VM configuration managing unit 112 acquires a providing function relating to the characteristics condition with respect to an IaaS from the IaaS information 142 (Step S150).

Figure 14:
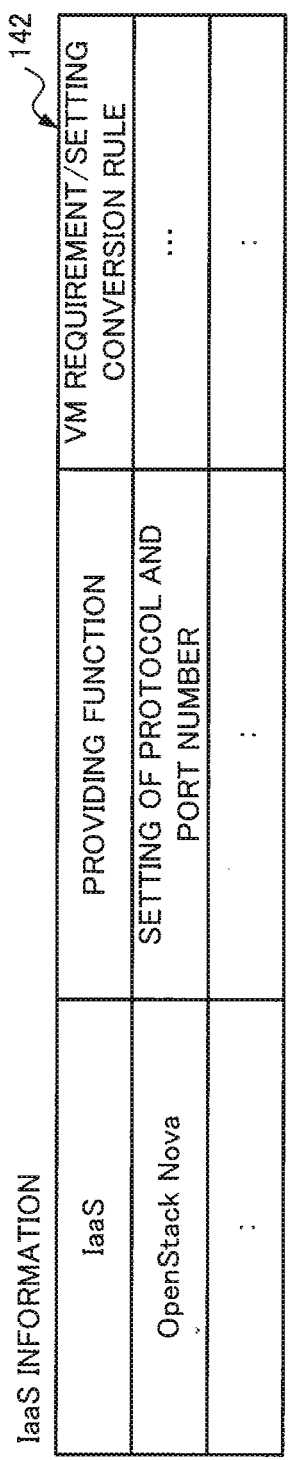
FIG. 14 is a diagram illustrating an example of IaaS information 142 in the first exemplary embodiment of the present invention.

FIG. 14 is a diagram illustrating an example of the IaaS information 142 in the first exemplary embodiment of the present invention. The IaaS information 142 indicates a providing function and a VM requirement/setting conversion rule for each IaaS, as illustrated in FIG. 14. The providing function indicates a function providable in a virtual machine to be generated by an IaaS concerning the characteristics condition of communication. The VM requirement/setting conversion rule indicates a conversion rule from a VM communication requirement to a VM setting to be described later.

The IaaS information 142 in FIG. 14 indicates such that it is possible, in a virtual machine to be generated by the IaaS "OpenStack Nova", to set a protocol and a port number for connection to the other virtual machine. Specifically, the IaaS information 142 in FIG. 14 indicates such that it is possible, in a virtual machine to be generated by the IaaS "OpenStack Nova", to establish connection in response to a connection request from the other virtual machine designating a specific protocol and a specific port number.

For example, when using the IaaS "OpenStack Nova" is designated from the user or the like, the VM configuration managing unit 112 acquires a providing function with respect to the IaaS "OpenStack Nova" from the IaaS information 142 in FIG. 14.

The VM configuration managing unit 112 extracts a communication requirement (hereinafter, called as an adaptable VM communication requirement) which the IaaS can satisfy from among the VM communication requirements included in the VM communication requirement information (Step S160). The VM configuration managing unit 112 extracts a VM communication requirement which the IaaS can satisfy with use of the providing function acquired in Step S150, as an adaptable VM communication requirement. The VM configuration managing unit 112 outputs the extracted adaptable VM communication requirement to the VM setting generation unit 122, as adaptable VM communication requirement information.

Figures 15, 16:
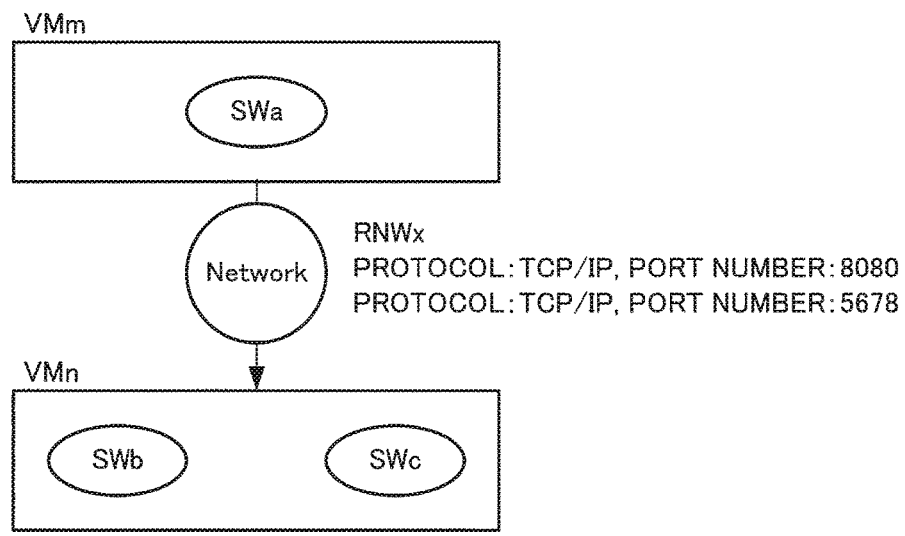
FIG. 15 is a diagram illustrating an example of adaptable VM communication requirement information in the first exemplary embodiment of the present invention.
FIG. 16 is a block diagram illustrating an example of a virtual network in the first exemplary embodiment of the present invention.

FIG. 15 is a diagram illustrating an example of the adaptable VM communication requirement information in the first exemplary embodiment of the present invention.

For example, the IaaS "OpenStack Nova" has a setting on a protocol and a port number as a providing function. In this case, the IaaS "OpenStack Nova" satisfies the characteristics condition designated by the VM communication requirement "RVMmn", namely, the protocol: TCP/IP and the port number: 8080, and the protocol: TCP/IP and the port number: 5678. Therefore, the VM configuration managing unit 112 extracts the adaptable VM communication requirement as illustrated in FIG. 15.

Subsequently, the NW configuration managing unit 113 converts a VM communication requirement included in the VM communication requirement information into an NW requirement, and generates NW requirement information (Step S170). For example, the NW configuration managing unit 113 generates, with respect to each of the VM communication requirements, an NW requirement having the same characteristics condition as the characteristics condition of the VM communication requirement.

FIG. 16 is a block diagram illustrating an example of a virtual network in the first exemplary embodiment of the present invention.

FIG. 17 is a diagram illustrating an example of the NW requirement information in the first exemplary embodiment of the present invention. The NW requirement information in FIG. 17 is associated with the connection in FIG. 16.

The NW requirement information indicates identifiers of virtual machines as a connection source/connection destination and the characteristics conditions relating to communication (connection) between virtual machines, as illustrated in FIG. 17.

For example, the NW configuration managing unit 113 generates the NW requirement "RNWx", in which the characteristics condition of the VM communication requirement "RVMmn" in the VM communication requirement information in FIG. 13 is set, as illustrated in FIG. 16 and FIG. 17.

The NW configuration managing unit 113 acquires a providing function relating to the characteristics condition with respect to a NaaS from the NaaS information 143 (Step S180).

Figure 18:
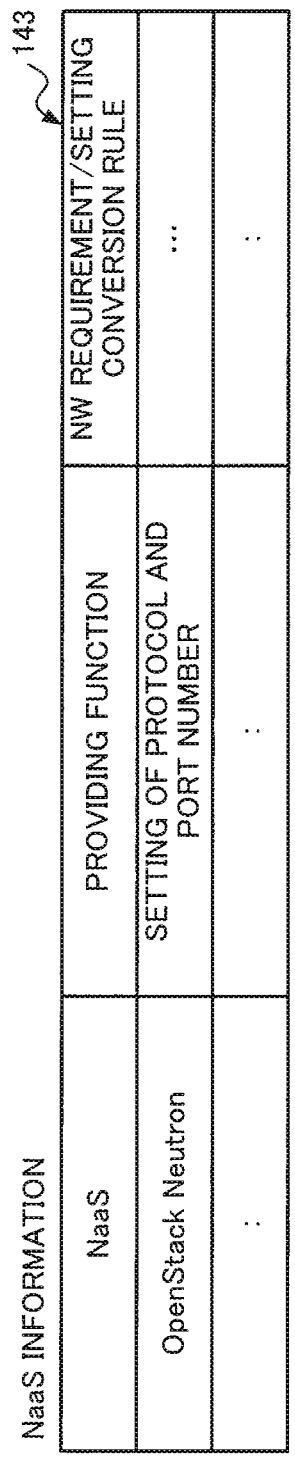
FIG. 18 is a diagram illustrating an example of NaaS information 143 in the first exemplary embodiment of the present invention.

FIG. 18 is a diagram illustrating an example of the NaaS information 143 in the first exemplary embodiment of the present invention. The NaaS information 143 indicates a providing function and an NW requirement/setting conversion rule for each NaaS, as illustrated in FIG. 18. The providing function indicates a function providable in a virtual network to be generated by a NaaS concerning the characteristics condition of communication. The NW requirement/setting conversion rule indicates a conversion rule from an NW requirement to an NW setting to be described later.

The NaaS information 143 in FIG. 18 indicates such that it is possible, in a virtual network to be generated by the NaaS "OpenStack Neutron", to set a protocol and a port number for connection between virtual machines. Specifically, the NaaS information 143 in FIG. 18 indicates such that, in a virtual network to be generated by the NaaS "OpenStack Neutron", connection between virtual machines designating a specific protocol and a specific port number is allowed.

For example, when using the NaaS "OpenStack Neutron" is designated by the user or the like, the NW configuration managing unit 113 acquires a providing function with respect to the NaaS "OpenStack Neutron" from the NaaS information 143 in FIG. 18.

The NW configuration managing unit 113 extracts a requirement (hereinafter, called as an adaptable NW requirement) which the NaaS can satisfy from among the NW requirements included in the NW requirement information (Step S190). The NW configuration managing unit 113 extracts an NW requirement which the NaaS can satisfy with use of the providing function acquired in Step S180 as an adaptable NW requirement. The NW configuration managing unit 113 outputs the extracted adaptable NW requirement to the NW setting generation unit 121 as adaptable NW requirement information.

FIG. 19 is a diagram illustrating an example of the adaptable NW requirement information in the first exemplary embodiment of the present invention.

For example, the NaaS "OpenStack Neutron" has a setting on a protocol and a port number as a providing function. In this case, the NaaS "OpenStack Neutron" satisfies the characteristics condition designated in the NW requirement "RNWx", namely, the protocol: TCP/IP and the port number: 8080, and the protocol: TCP/IP and the port number: 5678. Therefore, the NW configuration managing unit 113 extracts the adaptable NW requirement as illustrated in FIG. 19.

As described above, adaptable SW communication requirement information, adaptable VM communication requirement information, and adaptable NW requirement information are extracted on the basis of SW communication requirement information and SW deployment information input by the user.

Next, a setting generation process in the first exemplary embodiment of the present invention is described.

Figure 5:
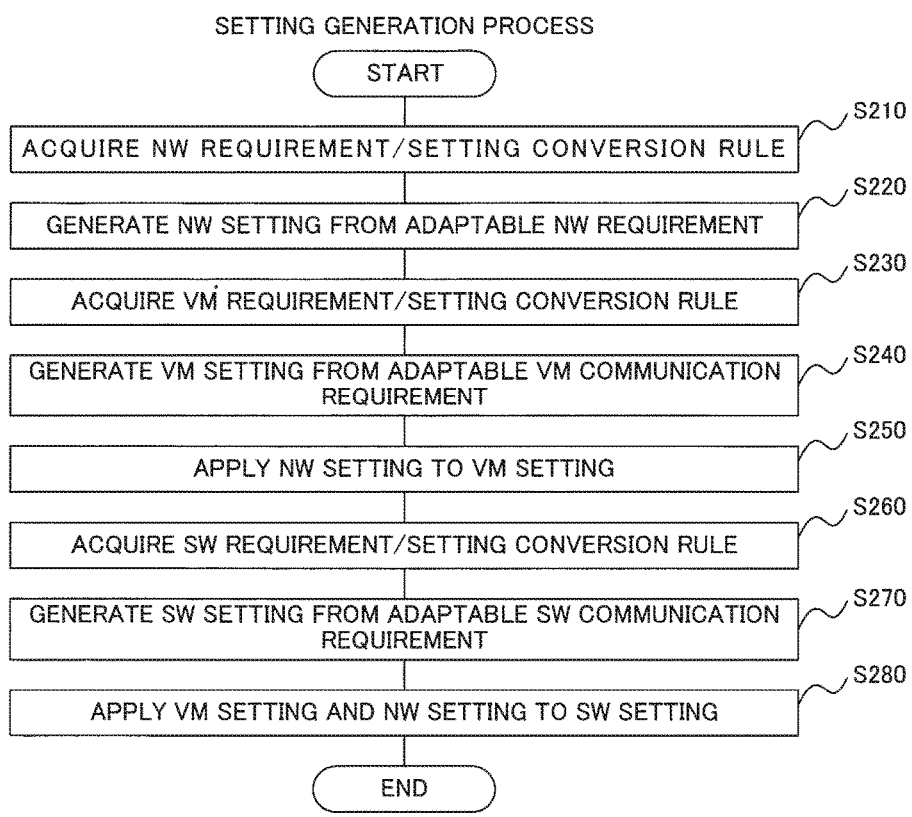
FIG. 5 is a flowchart illustrating a setting generation process in the first exemplary embodiment of the present invention.

FIG. 5 is a flowchart illustrating a setting generation process in the first exemplary embodiment of the present invention.

First of all, the NW setting generation unit 121 of the setting generation unit 120 acquires a conversion rule from an NW requirement to an NW setting (an NW requirement/setting conversion rule) from the NaaS information 143 (Step S210). The NW setting generation unit 121 applies the acquired NW requirement/setting conversion rule to an adaptable NW requirement, and generates an NW setting (Step S220). The NW setting generation unit 121 stores the generated NW setting in the setting storage unit 152 as NW setting information.

The NW requirement/setting conversion rule depends on the NaaS. When the NaaS is the NaaS "OpenStack Neutron", a network is used as an object. Further, an NW port and a security group are used as objects which implement the characteristics condition of communication. In the NW requirement/setting conversion rule, logic for converting an NW requirement into these objects is defined.

FIG. 20 is a diagram illustrating an example of an NW setting in the first exemplary embodiment of the present invention.

For example, the NW setting generation unit 121 generates "network1" as a network associated with the NW requirement "RNWx" (see FIG. 17) indicated by the adaptable NW requirement information in FIG. 19, as illustrated in FIG. 20. Further, in the NW requirement "RNWx", two virtual machines are connected. In this case, the NW setting generation unit 121 generates "Port1" and "Port2" on the network "network1", as NW ports; and assigns IP addresses to "Port1" and "Port2", respectively. Further, in the NW requirement "RNWx", the protocol: TCP/IP and the port number: 8080, and the protocol: TCP/IP and the port number: 5678 are set. In this case, the NW setting generation unit 121 generates the security group "group1", and sets the connection source/connection destination: Port1/Port2 and the port numbers: 8080, 5678.

Subsequently, the VM setting generation unit 122 acquires, from the IaaS information 142, a conversion rule from a VM communication requirement to a VM setting (a VM requirement/setting conversion rule) (Step S230). The VM setting generation unit 122 applies the acquired VM requirement/setting conversion rule to an adaptable VM communication requirement, and generates a VM setting (Step S240). The VM setting generation unit 122 stores the generated VM setting in the setting storage unit 152 as VM setting information.

The VM requirement/setting conversion rule depends on the IaaS. When the IaaS is the IaaS "OpenStack Nova", a VM instance is used as an object representing a virtual machine. Further, an interface on a VM instance is used as an object which implements the characteristics condition of communication. In the VM requirement/setting conversion rule, logic for converting a VM communication requirement into a setting on these objects is defined.

FIG. 21 is a diagram illustrating an example of VM setting information in the first exemplary embodiment of the present invention.

For example, the VM setting generation unit 122 generates "VMm" and "VMn" as VM instances associated with the VM communication requirement "RVMmn" (see FIG. 13) indicated by the adaptable VM communication requirement information in FIG. 15, as illustrated in FIG. 21. Further, the VM setting generation unit 122 generates "IF1" and "IF2" as interfaces on the VM instances "VMm" and "VMn", respectively.

The VM setting generation unit 122 applies an NW setting to a VM setting (Step S250). Applying an NW setting to a VM setting is a process of reflecting a setting with respect to an object of an NW setting on an object of a VM setting, such as associating an interface on each of the VM instances with an NW port on a network.

For example, the virtual machines as the connection source/connection destination in the VM communication requirement "RVMmn" in FIG. 13 are the virtual machines "VMm"/"VMn". In this case, the VM setting generation unit 122 sets the NW ports "Port1" and "Port2" of the connection source/connection destination in the NW setting in FIG. 20, on the interfaces "IF1" and "IF2" on the VM instances "VMm" and "VMn", as illustrated in FIG. 21.

Subsequently, the SW setting generation unit 123 acquires, from the SW information 141, a conversion rule from an SW communication requirement to an SW setting (an SW requirement/setting conversion rule) (Step S260). The SW setting generation unit 123 applies the acquired SW requirement/setting conversion rule to an adaptable SW communication requirement, and generates an SW setting (Step S270). The SW setting generation unit 123 stores the generated SW setting in the setting storage unit 152 as SW setting information.

The SW requirement/setting conversion rule depends on the component. When the component is Tomcat of a JAVA (registered trademark) application server, or Postgresql of RDB (Relational Database), the port number of a request to be received is used as a setting which implements the characteristics condition of communication. In this case, in the SW requirement/setting conversion rule, logic for converting an SW communication requirement into a setting on the port number in a component is defined.

FIG. 22 is a diagram illustrating an example of the SW setting information in the first exemplary embodiment of the present invention.

For example, the SW setting generation unit 123 generates "SWb" and "SWc" as objects associated with the SW communication requirements "RSWab" and "RSWac" (see FIG. 8) indicated by the adaptable SW communication requirement information in FIG. 11, as illustrated in FIG. 22. When the components "SWb" and "SWc" are respectively Tomcat and Postgresql, the SW setting generation unit 123 sets the port numbers to be designated by the SW communication requirements "RSWab" and "RSWac" in the objects "SWb" and "SWc".

The SW setting generation unit 123 applies a VM setting and an NW setting to an SW setting (Step S280). Applying a VM setting and an NW setting to an SW setting is a process of reflecting a setting with respect to objects of a VM setting and an NW setting on an object of an SW setting, such as a setting on the transmission source IP address when the component is Postgresq1.

For example, the component as the connection source in the SW communication requirement "RSWab" in FIG. 8 is the component "SWa", and the virtual machine in which the component "SWa" is deployed is the virtual machine "VMm". In this case, the SW setting generation unit 123 sets the IP address of the interface "IF1" of the VM instance "VMm" in the VM setting in FIG. 21, as the transmission source IP address of the component "SWc", as illustrated in FIG. 22.

As described above, NW setting information, VM setting information, and SW setting information are respectively generated on the basis of adaptable NW requirement information, adaptable VM communication requirement information, and adaptable SW communication requirement information.

Thereafter, the system configuration device of the system configuration environment 200 acquires NW setting information, VM setting information, and SW setting information from the setting storage unit 152 of the system design support device 100, and configures a system on a computer device and on a network device. The NaaS of the system configuration device performs generation and setting of a virtual network with use of the NW setting information. Further, the IaaS of the system configuration device performs generation and setting of a virtual machine with use of the VM setting information. Further, the system configuration device performs deployment and setting of a component on a generated virtual machine with use of the SW setting information.

Figure 23:
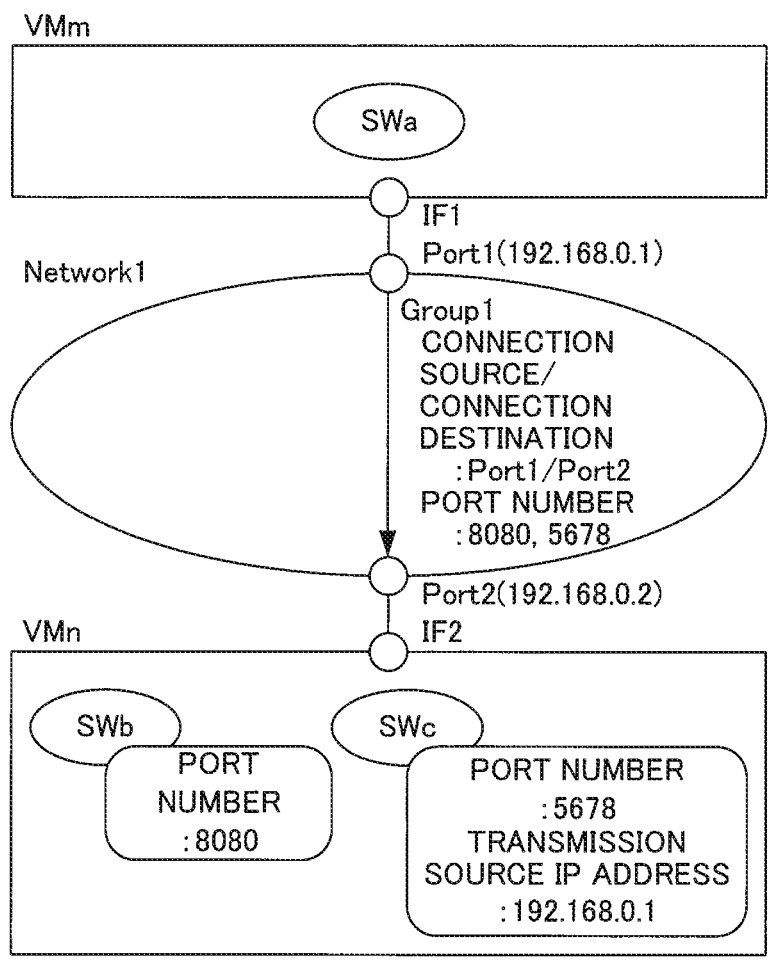
FIG. 23 is a diagram illustrating an example of a relationship among components, virtual machines, and a virtual network in the first exemplary embodiment of the present invention.

FIG. 23 is a diagram illustrating an example of a relationship among components, virtual machines, and a virtual network in the first exemplary embodiment of the present invention.

For example, the system configuration device performs generation and setting of a virtual network, generation and setting of virtual machines, and deployment and setting of components, as illustrated in FIG. 23.

In this way, the operation of the first exemplary embodiment of the present invention is completed.

In the first exemplary embodiment of the present invention, a system is configured by generating a virtual machine and a virtual network on a computer device and on a network device of the system configuration environment 200. The present invention, however, is not limited to the above. It is possible to configure a system by using a computer device and a network device, in place of using a virtual machine and a virtual network. In this case, the requirement conversion unit 110 generates a requirement for communication between computer devices on the basis of a requirement for communication between components, and on the basis of identifiers of the computer devices in which the components are deployed. Then, the requirement conversion unit 110 generates a requirement for a network on the basis of the generated requirement for communication between computer devices. Further, the setting generation unit 120 generates a setting relating to a network, a setting relating to communication between computer devices, and a setting relating to communication between components on the basis of a requirement for a network, a requirement for communication between computer devices, and a requirement for communication between components, respectively. Further, the system configuration device performs a setting relating to a network device, and a setting relating to a computer device in accordance with the generated setting relating to a network and a setting relating to communication between computer devices, and performs deployment and setting of components on a computer device.

Figure 1:
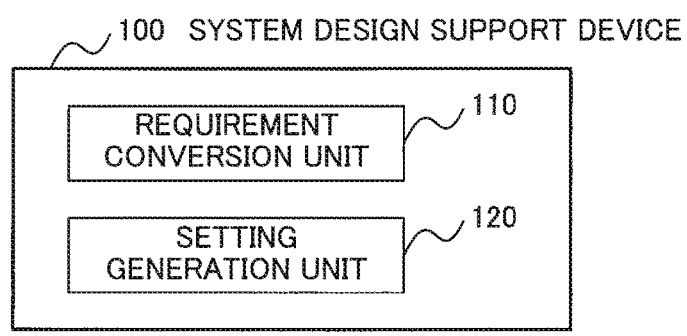
FIG. 1 is a block diagram illustrating a characteristic configuration of a first exemplary embodiment of the present invention.

Next, a characteristic configuration of the first exemplary embodiment of the present invention is described. FIG. 1 is a block diagram illustrating a characteristic configuration of the first exemplary embodiment of the present invention.

Referring to FIG. 1, the system design support device (information processing device) 100 includes the requirement conversion unit 110 and the setting generation unit 120.

The requirement conversion unit 110 generates a requirement for communication between computers based on a requirement for communication between software components included in a system, and based on identifiers of the computers in which the software components are deployed. The requirement conversion unit 110 generates a requirement for a network for connecting between the computers based on the requirement for communication between the computers.

The setting generation unit 120 generates a setting relating to a network, a setting relating to communication between computers, and a setting relating to communication between software components based on the requirement for the network, the requirement for communication between the computers, and the requirement for communication between the software components.

Next, the advantageous effects of the first exemplary embodiment of the present invention are described.

According to the first exemplary embodiment of the present invention, it is possible to maintain consistency between a requirement for communication with respect to software in a system and a requirement for a network, without re-designing a network by the user. This is because the system design support device 100 generates a setting relating to a network, a setting relating to communication between computers, and a setting relating to communication between software components, respectively, as described below. Specifically, the requirement conversion unit 110 of the system design support device 100 generates a requirement for communication between computers, and a requirement for a network based on a requirement for communication between software components included in a system, and based on identifiers of the computers in which the software components are deployed. Then, the setting generation unit 120 generates a setting relating to a network, a setting relating to communication between computers, and a setting relating to communication between software components based on the requirement for the network, the requirement for communication between the computers, and the requirement for communication between the software components. According to this configuration, the design quality of a system accompanying communication is enhanced.

Further, according to this configuration, it is possible to omit designing a requirement for a network by the user, and to reduce the workload of the user. This is advantageous in reducing the cost relating to system designing.

Second Exemplary Embodiment

Next, a second exemplary embodiment of the present invention is described.

The second exemplary embodiment of the present invention is different from the first exemplary embodiment of the present invention in a point that a judgment is made as to whether it is possible to configure a system that satisfies SW communication requirement information input by the user or the like in a requirement conversion process.

First of all, a configuration of the second exemplary embodiment of the present invention is described.

Figure 24:
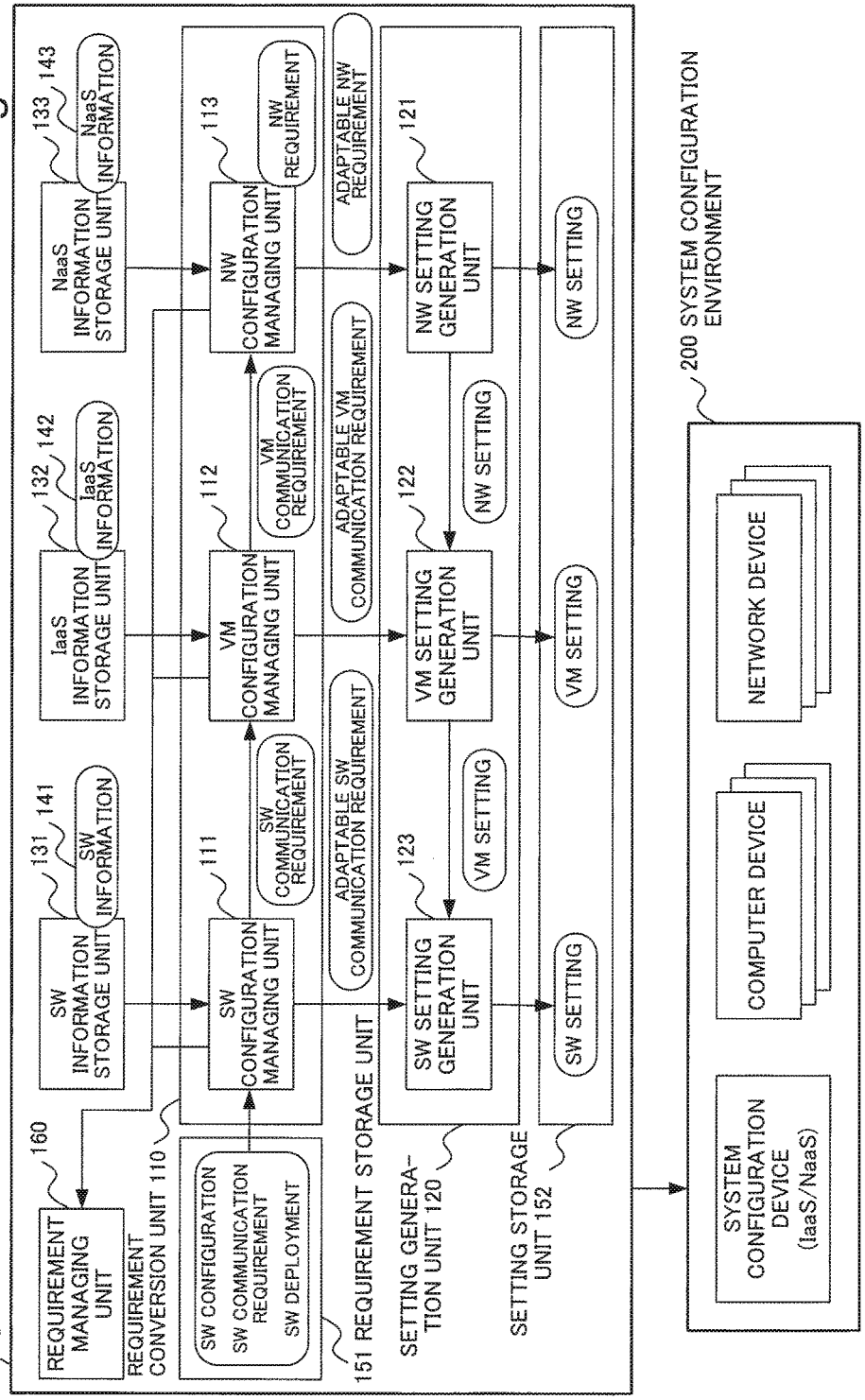
FIG. 24 is a block diagram illustrating a configuration of a system design support device 100 in a second exemplary embodiment of the present invention.

FIG. 24 is a block diagram illustrating a configuration of a system design support device 100 in the second exemplary embodiment of the present invention.

The system design support device 100 in the second exemplary embodiment of the present invention includes a requirement managing unit 160, in addition to the configuration of the system design support device 100 in the first exemplary embodiment of the present invention (see FIG. 2).

The requirement managing unit 160 generates communication requirement associated information indicating correlations between an SW communication requirement, a VM communication requirement, and an NW requirement in a requirement conversion process. The requirement managing unit 160 judges whether it is possible to configure a system that satisfies SW communication requirement information input by the user or the like, with use of the communication requirement associated information.

Next, an operation of the second exemplary embodiment of the present invention is described.

In this example, it is assumed that "RSW1" to "RSW4" are input as SW communication requirements.

Figure 25:
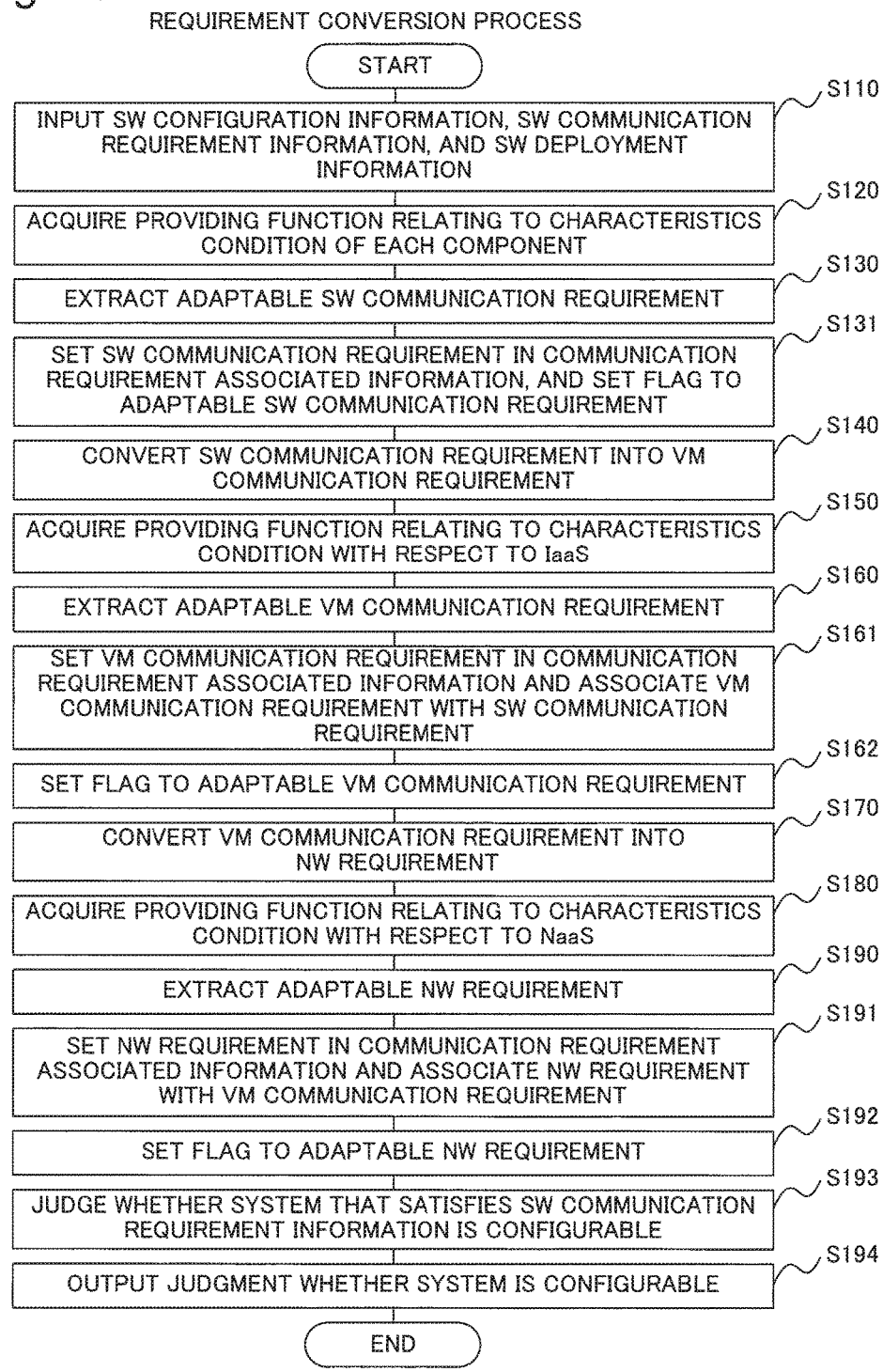
FIG. 25 is a flowchart illustrating a requirement conversion process in the second exemplary embodiment of the present invention.

FIG. 25 is a flowchart illustrating a requirement conversion process in the second exemplary embodiment of the present invention.

First of all, as well as the first exemplary embodiment of the present invention (see FIG. 4), the system design support device 100 accepts user's input of SW configuration information, SW communication requirement information, and SW deployment information (Step S110). The SW configuration managing unit 111 of the requirement conversion unit 110 acquires a providing function relating to the characteristics condition of each component from SW information 141 (Step S120). The SW configuration managing unit 111 extracts an adaptable SW communication requirement of each component from SW communication requirements included in the SW communication requirement information (Step S130).

The SW configuration managing unit 111 transmits, to the requirement managing unit 160, identifiers of the SW communication requirements included in the SW communication requirement information, and identifiers of the adaptable SW communication requirements.

The requirement managing unit 160 sets the identifiers of the received SW communication requirements in the communication requirement associated information, and sets a flag to the adaptable SW communication requirements (Step S131).

Figure 26:
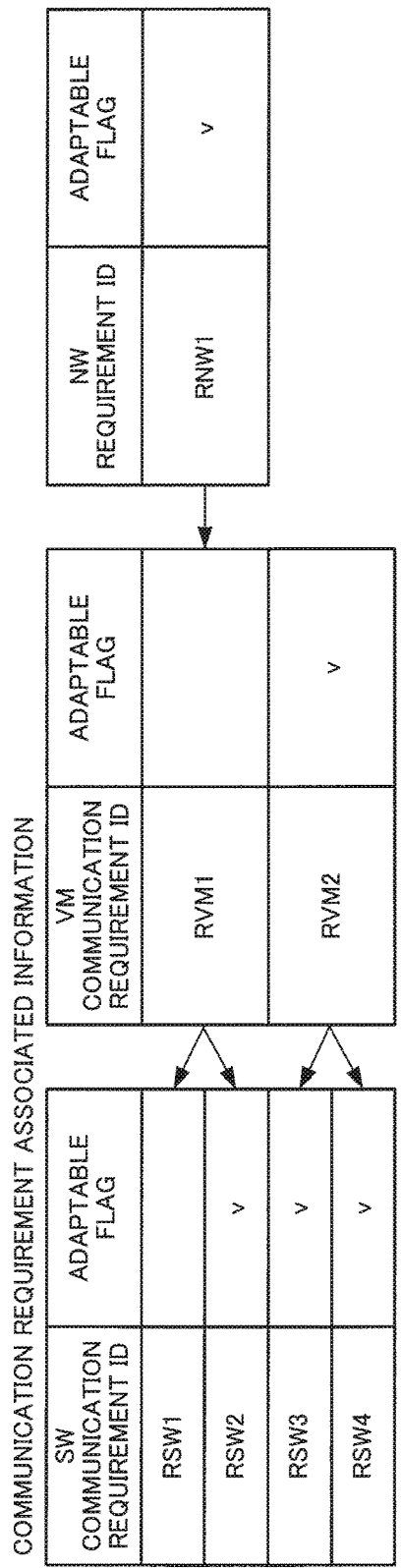
FIG. 26 is a diagram illustrating an example of communication requirement associated information in the second exemplary embodiment of the present invention.

FIG. 26 is a diagram illustrating an example of the communication requirement associated information in the second exemplary embodiment of the present invention.

For example, the requirement managing unit 160 sets the SW communication requirements "RSW1" to "RSW4" in the communication requirement associated information, as illustrated in FIG. 26. Further, when the SW communication requirements "RSW2" to "RSW4" are adaptable SW communication requirements out of the SW communication requirements "RSW1" to "RSW4", the requirement managing unit 160 sets the flag "v" to the adaptable SW communication requirements "RSW2" to "RSW4".

Next, as well as the first exemplary embodiment of the present invention, the VM configuration managing unit 112 converts an SW communication requirement included in the SW communication requirement information into a VM communication requirement, and generates VM communication requirement information (Step S140). The VM configuration managing unit 112 acquires a providing function relating to the characteristics condition with respect to an IaaS from IaaS information 142 (Step S150). The VM configuration managing unit 112 extracts an adaptable VM communication requirement from the VM communication requirements included in the VM communication requirement information (Step S160).

The VM configuration managing unit 112 transmits, to the requirement managing unit 160, identifiers of the VM communication requirements included in the VM communication requirement information, identifiers of the SW communication requirements to be satisfied by the respective VM communication requirements, and identifiers of the adaptable VM communication requirements.

The requirement managing unit 160 sets the identifiers of the received VM communication requirements in the communication requirement associated information, and associates each of the VM communication requirements with the SW communication requirement to be satisfied by the corresponding VM communication requirement (Step S161). Subsequently, the requirement managing unit 160 sets a flag to the adaptable VM communication requirement (Step S162).

For example, when the SW communication requirements "RSW1" and "RSW2" are converted into the VM communication requirement "RVM1" (when the VM communication requirement "RVM1" satisfies the SW communication requirements "RSW1" and "RSW2"), the requirement managing unit 160 associates the VM communication requirement "RVM1" with the SW communication requirements "RSW1" and "RSW2", as illustrated in FIG. 26. Likewise, the requirement associating unit 160 associates the VM communication requirement "RVM2" with the SW communication requirements "RSW3" and "RSW4". Further, when the VM communication requirement "RVM2" is an adaptable VM communication requirement out of the VM communication requirements "RVM1" and "RSW2", the requirement managing unit 160 sets the flag "v" to the adaptable VM communication requirement "RVM2", as illustrated in FIG. 26.

Subsequently, as well as the first exemplary embodiment of the present invention, the NW configuration managing unit 113 converts a VM communication requirement included in the VM communication requirement information into an NW requirement, and generates NW requirement information (Step S170). The NW configuration managing unit 113 acquires a providing function relating to the characteristics condition with respect to a NaaS from NaaS information 143 (Step S180). The NW configuration managing unit 113 extracts the adaptable NW requirement from the NW requirements included in the NW requirement information (Step S190).

The NW configuration managing unit 113 transmits, to the requirement managing unit 160, identifiers of the NW requirements included in the NW requirement information, identifiers of the VM communication requirements to be satisfied by the respective NW requirements, and identifiers of the adaptable NW requirements.

The requirement managing unit 160 sets the identifiers of the received NW requirements in the communication requirement associated information, and associates each of the NW requirements with the VM communication requirement to be satisfied by the corresponding NW requirement (Step S191). Subsequently, the requirement managing unit 160 sets a flag to the adaptable NW requirement (Step S192).

For example, when the VM communication requirement "RVM1" is converted into the NW requirement "RNW1" (when the NW requirement "RNW1" satisfies the VM communication requirement "RVM1"), the requirement managing unit 160 associates the NW requirement "RNW1" with the VM communication requirement "RVM1", as illustrated in FIG. 26. Further, when the NW requirement "RNW1" is an adaptable NW requirement, the requirement managing unit 160 sets the flag "v" to the adaptable NW requirement "RNW1", as illustrated in FIG. 26.

Subsequently, the requirement managing unit 160 judges whether it is possible to configure a system that satisfies the SW communication requirement information with use of the communication requirement associated information (Step S193). In this example, the requirement managing unit 160 sequentially checks the VM communication requirements and the NW requirements that are associated with each of the SW communication requirements included in the communication requirement associated information. When at least one of the adaptable flags in the SW communication requirements, the VM communication requirements, and the NW requirements is set, the requirement managing unit 160 judges that the SW communication requirement is satisfied. When all the SW communication requirements included in the communication requirement associated information are satisfied, the requirement managing unit 160 judges that it is possible to configure a system that satisfies the SW communication requirement information.

For example, in FIG. 26, an adaptable flag is set in the NW communication requirement "RNW1", which is associated with the SW communication requirement "RSW1". Further, an adaptable flag is set in the SW communication requirement "RSW2", and in the NW communication requirement "RNW1" which is associated with the SW communication requirement "RSW2". An adaptable flag is set in the SW communication requirement "RSW3" and in the VM communication requirement "RVM2" which is associated with the SW communication requirement "RSW3". An adaptable flag is set in the SW communication requirement "RSW4", and in the VM communication requirement "RVM2" which is associated with the SW communication requirement "RSW4". Therefore, the requirement managing unit 160 judges that it is possible to configure a system that satisfies the SW communication requirements "RSW1" to "RSW4".

The requirement managing unit 160 outputs to the user a judgment result as to whether it is possible to configure a system (Step S194).

Alternatively, the requirement managing unit 160 may instruct a setting generation unit 120 to extract a redundant setting for satisfying an SW communication requirement with use of the communication requirement associated information, and not to generate the extracted setting.

For example, in FIG. 26, an adaptable flag is set in the NW communication requirement "RNW1". In this case, if an NW setting relating to the NW communication requirement "RNW1" is performed, the SW communication requirements "RSW1" and "RSW2" are satisfied. Specifically, the SW communication requirements "RSW1" and "RSW2" are satisfied, even if a VM setting relating to the VM communication requirement "RVM1", which is associated with the NW communication requirement "RNW1", and SW settings relating to the SW communication requirements "RSW1" and "RSW2", which are associated with the VM communication requirement "RVM1" are not performed. Therefore, in this case, the requirement managing unit 160 instructs the setting generation unit 120 to omit generation of an SW setting relating to the SW communication requirement "RSW2" in which an adaptable flag is set, for example.

In this way, the operation of the second exemplary embodiment of the present invention is completed.

Next, the advantageous effects of the second exemplary embodiment of the present invention are described.

According to the second exemplary embodiment of the present invention, the user can confirm whether it is possible to configure a system that satisfies a requirement for communication between software components in a system configuration environment, in addition to the advantageous effects of the first exemplary embodiment. Further, it is possible to omit a redundant setting with respect to a software component, a virtual machine, and a virtual network.

This is because, as described below, the requirement managing unit 160 judges whether it is possible to configure a system that satisfies SW communication requirement information input from the user or the like, or extracts a redundant setting. Specifically, the requirement managing unit 160 generates communication requirement associated information indicating correlations between an SW communication requirement, a VM communication requirement, and an NW requirement, and performs judgement or extraction as described above on the basis of the communication requirement associated information in a requirement conversion process.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-191725, filed on Sep. 17, 2013, the disclosure of which is incorporated herein in its entirety by reference.

REFERENCE SIGNS LIST

100 System design support device
110 Requirement conversion unit
111 SW configuration managing unit
112 VM configuration managing unit
113 NW configuration managing unit
120 Setting generation unit
121 NW setting generation unit
122 VM setting generation unit
123 SW setting generation unit
131 SW information storage unit
132 IaaS information storage unit
133 NaaS information storage unit
141 SW information
142 IaaS information
143 NaaS information
151 Requirement storage unit
152 Setting storage unit
160 Requirement managing unit
171 CPU
172 Storage medium
173 Communication unit
174 Input unit
175 Output unit
200 System configuration environment

The invention claimed is:

1. An information processing device comprising:
a memory storing instructions; and
one or more processors configured to execute the instructions to:
generate a computer communication requirement, based on a software communication requirement and identifiers of computers in which software components in a system are to be deployed in an environment, the software communication requirement indicating a connection between software components to be connected among the software components in the system and characteristics conditions of the connection between the software components to be connected, the computer communication requirement indicating a connection between computers to be connected among the computers in the environment and characteristics conditions of the connection between the computers to be connected, and generate a network requirement, based on the computer communication requirement, the network requirement indicating a connection to be provided by a network in the environment and characteristics conditions of the connection to be provided by the network; and
generate a network setting, a computer communication setting, and a software communication setting, based on the network requirement, the computer communication requirement, and the software communication requirement, respectively, the network setting indicating information for configuring the connection to be provided by the network, the computer communication setting indicating information for configuring the computers to be connected with respect to the connection between the computers to be connected, and the software communication setting indicating information for configuring the software components to be connected with respect to the connection between the software components to be connected.

2. The information processing device according to claim 1, wherein
the one or more processors are configured to further execute the instructions to:
extract a network requirement that is able to be satisfied by the environment from the network requirement, a computer communication requirement that is able to be satisfied by the computers to be connected from the computer communication requirement, and a software communication requirement that is able to be satisfied by the software components to be connected from the software communication requirement, and
the network setting, the computer communication setting, and the software communication setting are generated based on the extracted network requirement, the extracted computer communication requirement, and the extracted software communication requirement.

3. The information processing device according to claim 1, wherein
the one or more processors are configured to further execute the instructions to:
apply the network setting to the generated computer communication setting, and apply at least one of the network setting and the computer communication setting to the generated software communication setting.

4. The information processing device according to claim 2, wherein
the one or more processors are configured to further execute the instructions to:
judge, for each of one or more software communication requirements, that the software communication requirement is satisfied, when at least one of expressions that the software communication requirement is able to be satisfied by the software components to be connected, the computer communication requirement that satisfies the software communication requirement is able to be satisfied by the computers to be connected, and the network requirement that satisfies the computer communication requirement is able to be satisfied by the environment, is true, and
judge that the system is configurable when it is judged that all of the one or more software communication requirements are satisfied.

5. The information processing device according to claim 1, wherein
the computers in the environment are virtual machines,
the network in the environment is a virtual network, and
generation of the virtual network, generation of the virtual machines, and deployment of the software components in the system on the virtual machines are performed in the environment, by use of the generated network setting, the generated computer communication setting, and the generated software communication setting.

6. A system design support method comprising:
generating a computer communication requirement, based on a software communication requirement and identifiers of computers in which software components in a system are to be deployed in an environment, the software communication requirement indicating a connection between software components to be connected among the software components in the system and characteristics conditions of the connection between the software components to be connected, the computer communication requirement indicating a connection between computers to be connected among the computers in the environment and characteristics conditions of the connection between the computers to be connected, and generate a network requirement, based on the computer communication requirement, the network requirement indicating a connection to be provided by a network in the environment and characteristics conditions of the connection to be provided by the network; and
generating a network setting, a computer communication setting, and a software communication setting, based on the network requirement, the computer communication requirement, and the software communication requirement, respectively, the network setting indicating information for configuring the connection to be provided by the network, the computer communication setting indicating information for configuring the computers to be connected with respect to the connection between the computers to be connected, and the software communication setting indicating information for configuring the software components to be connected with respect to the connection between the software components to be connected.

7. The system design support method of claim 6, further comprising:
extracting a network requirement that is able to be satisfied by the environment from the network requirement, a computer communication requirement that is able to be satisfied by the computers to be connected from the computer communication requirement, and a software communication requirement that is able to be satisfied by the software components to be connected from the software communication requirement, and the network setting, the computer communication setting, and the software communication setting are generated based on the extracted network requirement, the extracted computer communication requirement, and the extracted software communication requirement.

8. The system design support method of claim 6, further comprising:

applying the network setting to the generated computer communication setting, and apply at least one of the network setting and the computer communication setting to the generated software communication setting.

9. The system design support method of claim 7, further comprising:

judging, for each of one or more software communication requirements, that the software communication requirement is satisfied, when at least one of expressions that the software communication requirement is able to be satisfied by the software components to be connected, the computer communication requirement that satisfies the software communication requirement is able to be satisfied by the computers to be connected, and the network requirement that satisfies the computer communication requirement is able to be satisfied by the environment, is true, and judge that the system is configurable when it is judged that all of the one or more software communication requirements are satisfied.

10. A non-transitory computer-readable storage medium recording thereon a program, causing a computer for a support design support device to perform a method comprising:

generating a computer communication requirement, based on a software communication requirement and identifiers of computers in which software components in a system are to be deployed in an environment, the software communication requirement indicating a connection between software components to be connected among the software components in the system and characteristics conditions of the connection between the software components to be connected, the computer communication requirement indicating a connection between computers to be connected among the computers in the environment and characteristics conditions of the connection between the computers to be connected, and generate a network requirement, based on the computer communication requirement, the network requirement indicating a connection to be provided by a network in the environment and characteristics conditions of the connection to be provided by the network; and generating a network setting, a computer communication setting, and a software communication setting, based on the network requirement, the computer communication requirement, and the software communication requirement, respectively, the network setting indicating information for configuring the connection to be provided by the network, the computer communication setting indicating information for configuring the computers to be connected with respect to the connection between the computers to be connected, and the software communication setting indicating information for configuring the software components to be connected with respect to the connection between the software components to be connected.

* * * * *